M. & S. G. TUFTS.
Evaporating Pan.

No. 34,655. Patented March 11, 1862.

Witnesses

Inventors
M. Tufts
S. G. Tufts
per Munn & Co
Attorneys

UNITED STATES PATENT OFFICE.

M. TUFTS AND S. G. TUFTS, OF MAINVILLE, OHIO.

IMPROVED APPARATUS FOR EVAPORATING SUGAR-JUICE.

Specification forming part of Letters Patent No. 34,655, dated March 11, 1862.

*To all whom it may concern:*

Be it known that we, M. TUFTS and S. G. TUFTS, both of Mainville, in the county of Warren and State of Ohio, have invented a new and Improved Apparatus for Evaporating Saccharine Liquids; and we do hereby declare that the following is a full, clear, and exact description of the same, reference being had to the accompanying drawings, forming part of this specification, in which—

Figure 1:
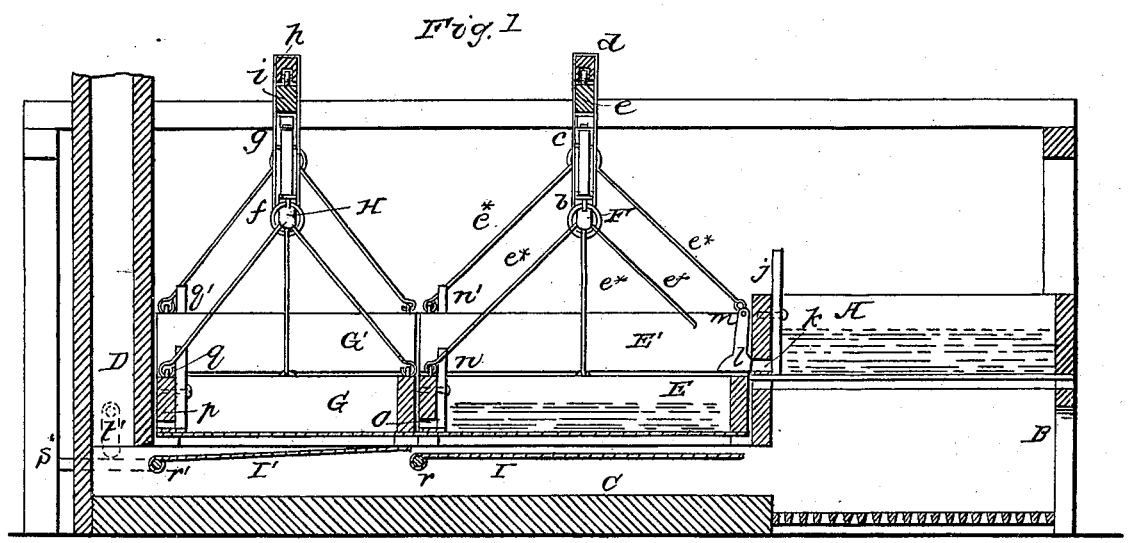
Figure 2:
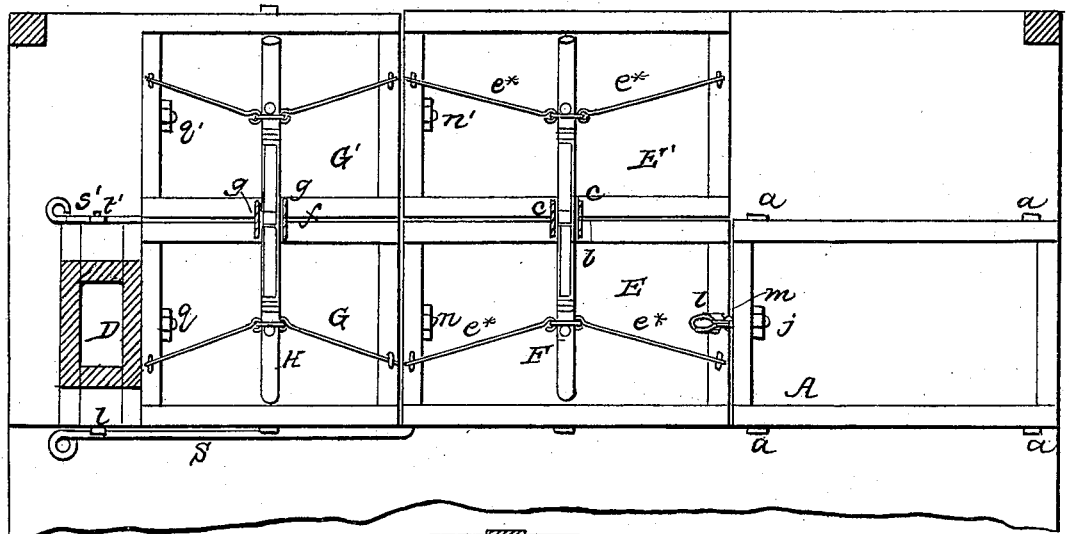
Figure 3:
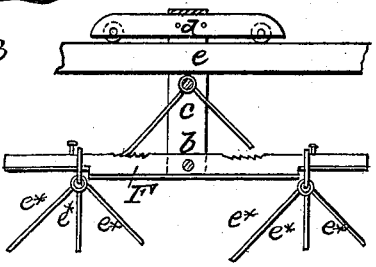

Figure 1 represents a longitudinal vertical section of our invention. Fig. 2 is a horizontal section of the same. Fig. 3 is a detached elevation of the mechanism for elevating and shifting the pans.

Similar letters in the three figures refer to like parts.

The object of this invention is to provide for the removal of the gum or sediment which is produced by the boiling of saccharine liquids, and particularly by the boiling of the juice of sorghum-cane, and which, when not removed, is the cause of that particular green or acid taste so common in the molasses.

Our invention is based on the observation that said gum is precipitated when the juice is boiled down to about 20° or 30° Baumé, and if the heating is now discontinued, the clear juice or sirup can be drawn off; but if the boiling is continued before separation until the juice reaches the state of molasses, the gum becomes so melted and combined with the molasses that it cannot be removed.

Our invention consists in the arrangement of two or more sets of swinging adjustable pans, in combination with a heater and furnace, in such a manner that the juice can be passed from the heater into either one of the first set of pans, and thence into either one of the second set, &c., and that the heating in either of the pans can be discontinued at the desired point, thereby giving to the operator an opportunity to draw off the clear sirup without interrupting the operation of boiling.

It consists, further, in suspending each set of pans from an oscillating lever, which connects, by a suitable strap, with a transversely-moving carriage in such a manner that each pan can be lowered on the flue, or raised and shifted to make room for the adjoining pan, as may be desired; and it consists, also, in the arrangement of a continuous flue open on the top, and provided with a series of adjustable dampers, in combination with the swinging pans, in such a manner that the bottom of each pan, when lowered down upon the flue, forms the top of the latter, and that by the action of said adjustable dampers the heat which comes in contact with the bottom of either of the pans that may be lowered upon the flue can be regulated at pleasure.

To enable those skilled in the art to make and use our invention, we will proceed to describe its construction and operation, with reference to the drawings.

The heater A, which is intended for a preliminary heating of the juice, is placed directly over the furnace B, and it is provided with ears $a$, which keep it in the proper position and prevent it being thrown off sidewise. From said furnace B the flue C extends to the chimney D. This flue is open on the top, and its height, as compared with the furnace, is such that if one of the pans is placed on the same the top edge of said pan is about on a level with the top edge of the furnace B, or with the bottom of the heater A. The first set of pans, E E', are suspended by means of bars or chains $e^*$ from a lever, F, that is fulcrated on a pivot, $b$, in a strap, $c$, and said strap is suspended from a carriage, $d$, that moves in a plane at right angles to the direction of the flue on the top edge of the beam $e$. By moving the carriage on the beam $e$ either one of the pans E E' can be brought directly over the flue C, and if, now, the lever F is inclined, said pan can be lowered down upon the flue, as clearly shown in Fig. 1 of the drawings. The second set of pans, G G', are suspended from a lever, H, which vibrates on a pivot, $f$, in a strap, $g$, that is suspended from a carriage, $h$, moving on the beam $i$, in every respect precisely like the first set of pans E E'.

The heater A is provided with a gate, $j$, to open and close the discharge-opening $k$, and a spout, $l$, serves to conduct the juice from the heater to either of the pans E E'. Said spout is hinged to the heater by means of the staple $m$, or in any other convenient manner, so that it can be turned up out of the way when not used, and that it does not interfere with the motions of the pans. Each of the pans E E' is provided with a gate, $n\ n'$, which gates close the discharge-openings $o$, and by which the discharge of the juice or sirup from the pans E E' to pans G G' is regulated. From the pans G G' the juice or molasses is discharged through apertures which are closed by gates $q\ q'$.

The flue C is furnished with dampers I I', which are so arranged that by their aid the heat under the several pans can be regulated. The damper I, the position of which corresponds to the position of the pans E E', is secured to a rock-shaft, $r$, that has its bearings in the sides of the flue, and its position is regulated by a lever, $s$, and button $t$. In the same manner the damper I', which corresponds to the pans G G', is secured to the rock-shaft $r'$, and its position is regulated by the lever $s'$ and button $t'$.

In Fig. 1 of the drawings the damper I is turned down, so that the heat from the furnace passes between it and the bottom of the pan, and it will easily be understood that by raising or lowering the loose end of said damper the heat which acts on the bottom of the pan can be regulated. The damper I', on the other hand, is turned up, so that it cuts off the heat from the bottom of the pan.

The operation is as follows: The juice from the crusher runs into the heater A, where a preliminary heating of the same takes place. When ready to commence boiling, the damper I' is turned up or closed and the pans G G' are elevated to a level. Pan E is placed on the flue, the gate $j$ opened, and the spout $l$ is turned down, so as to conduct the juice from the heater A into the pan E. As soon as said pan is filled, the gate $j$ is closed, and when the juice is boiled down to about one-half, the damper I is turned up, and by means of the swinging lever F the pan E is now elevated and brought on a level with pan E', and by rolling the carriage $d$ along on the beam $e$, pan E is removed from the flue, and pan E' is then lowered and filled with the boiling juice from the heater. In the meantime the sirup in the pan E is allowed to cool until the gum or sediment is precipitated to the bottom, which point can be readily determined by experiment. Pan G is now lowered on the flue and the damper I' is turned down, and then, by means of a suitable spout inserted into the opening $o$ of the pan E, the sirup is emptied into pan G and there boiled to molasses. In emptying the sirup from the pan E to the pan G care should be taken that it is emptied no faster than it can be kept boiling in the pan G, which can be regulated by the gate $n$. After the sirup in the pan G is boiled down to the desired point said pan is removed from the flue by means of the swinging lever H and carriage $h$, and the molasses is discharged through the aperture $p$. At the same time the pan G' is lowered on the flue and filled from the pan E', as previously directed. After emptying a pan it should be thoroughly cleansed before it is used again. By this arrangement it will be seen that two pans and the heater are kept constantly boiling. The sediment is removed before the final boiling, which converts the sirup to molasses. Each pan of sirup is kept by itself from beginning to end, and all the parts are equally heated.

By the application of the dampers all waste of heat is prevented, and at the same time the heat can be so regulated that no scorching can take place, and by the use of the swinging levers F H and carriages $d\ h$ the handling of the pans is rendered comparatively easy.

Having thus fully described our invention, what we claim as new, and desire to secure by Letters Patent, is—

1. The arrangement and combination of two or more sets of swinging adjustable pans, E E' G G', with the flue C, heater A, and furnace B, all constructed, operated, and operating substantially in the manner and for the purpose shown and described.

2. The combination, with the pans E E' G G', of swinging levers F H and transversely-moving carriages $d\ h$, substantially as and for the purpose specified.

3. The arrangement of the continuous open flue C and dampers I I', in combination with the pans E E' G G', as and for the purpose set forth.

MOSES TUFTS.
SETH G. TUFTS.

Witnesses:
L. A. MILES,
JOHN HOPKINS,
S. F. STEVENS.